United States Patent [19]

Fedele

[11] Patent Number: 4,858,107
[45] Date of Patent: Aug. 15, 1989

[54] COMPUTER DEVICE DISPLAY SYSTEM USING CONDITIONALLY ASYNCHRONOUS MEMORY ACCESSING BY VIDEO DISPLAY CONTROLLER

[75] Inventor: Nicola J. Fedele, Kingston, N.J.

[73] Assignee: General Electric Company, Schenectady, N.Y.

[21] Appl. No.: 7,536

[22] Filed: Jan. 28, 1987

Related U.S. Application Data

[63] Continuation-in-part of Ser. No. 710,292, Mar. 11, 1985, abandoned, and a continuation-in-part of Ser. No. 710,295, Mar. 11, 1985, abandoned.

[51] Int. Cl.⁴ .................. G06F 3/14; G06F 3/153; G06F 13/30; G06F 15/62
[52] U.S. Cl. .................. 364/200; 364/246.3; 364/238.7; 364/270; 364/271.5; 364/271.6; 364/242.7; 364/237.3; 364/270.2; 364/518; 364/521
[58] Field of Search ........ 364/518, 521, 200 MS File, 364/900 MS File

[56] References Cited

U.S. PATENT DOCUMENTS

| | | | |
|---|---|---|---|
| 4,415,985 | 11/1983 | Mcdaniel | 364/900 |
| 4,595,917 | 6/1986 | McCallister et al. | 340/798 |
| 4,620,186 | 10/1986 | Krause et al. | 340/798 |
| 4,811,109 | 3/1989 | Shimizu | 358/256 |

Primary Examiner—Archie E. Williams, Jr.
Assistant Examiner—Emily Y. Chan
Attorney, Agent, or Firm—William Squire; James C. Davis, Jr.; Paul R. Webb, II

[57] ABSTRACT

A computer system has a central processing unit and a video display processor both of which must directly access the system memory. The display processor must access the memory once in a given time period which time period is long enough that several accesses by the central processing unit and the display processor would be possible. The system includes a memory controller which allows the central processing unit to have memory access priority over the display processor, as long as sufficient time remains in the period for the display processor to complete its access after the access by the processing unit. If insufficient time remains, the display processor has priority for memory access. To implement this priority scheme, a new system memory organization is employed, dividing the memory into banks or bit planes and providing each bank with a respective temporary storage latch that loads to a respective shift register. The serial data stream from the shift registers supply the video display processor video code information on a continuing basis. The timing of memory read out to the temporary storage latches is timed in accordance with the memory priority protocol.

15 Claims, 7 Drawing Sheets

COMPUTER DEVICE DISPLAY SYSTEM USING CONDITIONALLY ASYNCHRONOUS MEMORY ACCESSING BY VIDEO DISPLAY CONTROLLER

This is a continuation-in-part of application Ser. No. 710,292 now abandoned, and of application Ser. No. 710,295, now abandoned, both filed Mar. 11, 1985 and incorporated herein by reference.

The present invention relates to computer devices and display systems having random-access memory accessed both by a central processing unit (CPU) and by a video display processor (VDP) for generating the video signals used for display.

BACKGROUND OF THE INVENTION

Personal computers and smart terminals have a central processing unit (CPU) or microprocessor for carrying out arithmetic functions. In addition, these computer devices have a video display processor (VDP) for converting video codes to information for display on a video type monitor. The video codes are stored in a random access memory (RAM) within the personal computer. This memory must also be accessed by the CPU, which generates the digital representation of the images to be displayed. Access by the VDP is supervised by a video display controller (VDC). The video codes supplied to the VDP from the RAM may be ones that can be converted directly to analog video signals in a digital-to-analog conversion. Alternatively, the video codes may be addresses for color map memory, read-outs from which are converted to analog video signals in a digital-to-analog conversion.

In prior-art computer devices of this general type, the VDC has had priority for accessing the RAM; and the CPU, which attempts to access the RAM on a generally irregular basis has had to wait for access when the VDP is accessing the RAM. This has the undesired effect of slowing the operation of the CPU, particularly when the VDP must frequently as well as regularly access the RAM.

McCallister et al. in their U.S. Pat. No. 4,595,917 issued June 17, 1986 and entitled "DATA PROCESSING FOR COMPUTER COLOR GRAPHIC SYSTEM" describe a RAM architecture wherein the memory is divided into n banks, each descriptive of a particular bit plane in the digital codes descriptive of display video. Each bank of memory has an m-bit-wide output port. Here m and n are each positive integers greater than one—e.g., sixteen and four, respectively. Of the n banks of memory, each except one of them reads to a respective parallel-input m-bit-wide latch, thereafter to side-load a respective m-stage shift register. The m-bit-wide outputs of the n banks are serially polled on a regularly recurring basis to side-load all n of the m-stage shift registers. The n shift registers are then simultaneously serially read out at normal pixel scan rate, to generate m successive n-bit-wide codes descriptive of display video.

In an m-pixel display cycle McCallister et al. only have to access the RAM n times, rather than m times—e.g., four times, rather than sixteen. They perform these n accesses per m-pixel display cycle on a regular basis. There is, then, m/n times as good a probability that the CPU will not be called upon to wait because of the accessing of the RAM by the VDP. This speeds up the data processing by the CPU. Supposing the VDP accesses the RAM at a full available access rate, the CPU will be free (m-n)/m of the time to access RAM without waiting.

In my applications Ser. Nos. 710,292 and 710,295 filed Mar. 11, 1985, I describe a RAM structure similar to that described by McCallister et al. except for all n banks of the RAM reading to a respective parallel-input m-bit-wide latch, thereafter to side-load a respective m-stage shift register. The use of the extra m-bit-wide latch, although a simple modification to RAM structure, has profound effects upon the flexibility of RAM operation. In the prior art the RAM has been accessed by the VDP on a regularly recurring basis, but particularly with my RAM architecture this is not necessary to do. In my RAM architecture each bank needs to be read from once per m pixel display cycle, but does not need to be read from regularly every m pixels. As I describe particularly in application Ser. No. 710,295 this permits a RAM access protocol where the CPU has access without wait to the RAM more than (m-n)/m of the time. This is provided by VDP access being capable of limited waits, owing to all n of the m-stage shift registers being preceded by m-bit-wide latches with temporary storage capability.

Further the RAM architecture described in applications Ser. Nos. 710,292 and 710,295 can be modified to permit the banks to load their m-bit-wide output data parallelly or partially parallelly, as well as serially, to respective latches, thereafter to side-load respective m-stage shift registers. This permits a RAM access protocol where the CPU has access without wait to the RAM (m-1)/m of the time if the VDP regularly accesses the RAM. RAM access protocols where the CPU has even less restricted asses to the RAM are made possible by subjecting VDP access to limited waits, as described above.

SUMMARY OF THE INVENTION

The present invention is embodied in a computer system having a random access memory (RAM) accessible to both a central processing unit (CPU) and a video display processor (VDP), the RAM being structurally modified to permit an improved protocol for its accessing by the CPU and VDP. The RAM is divided into a plurality, n in number, of banks, each describing a respective bit plane of the digital codes descriptive of display video that are to be supplied to the VDP. A plurality, m in number, of bits descriptive of m successive pixels in a raster scan are down-loaded in parallel from each RAM bank to a respective m-bit-wide latch at a respective selected time, thereafter to be transferred at a later respective time to the m successive stages of a respective shift register. The n shift registers are loaded simultaneously every $m^{th}$ pixel and are serially read from in parallel to supply digital codes descriptive of display video to the VDP. The accessing of the banks of RAM is done with the CPU having priority to access the RAM banks and the VDP having to wait for access when conflict for access occurs, until access by the VDP is essential. At this time the VDC assumes priority to access the RAM banks, and the CPU has to wait for access when conflict for access occurs.

DETAILED DESCRIPTION OF THE INVENTION

Figure 1:
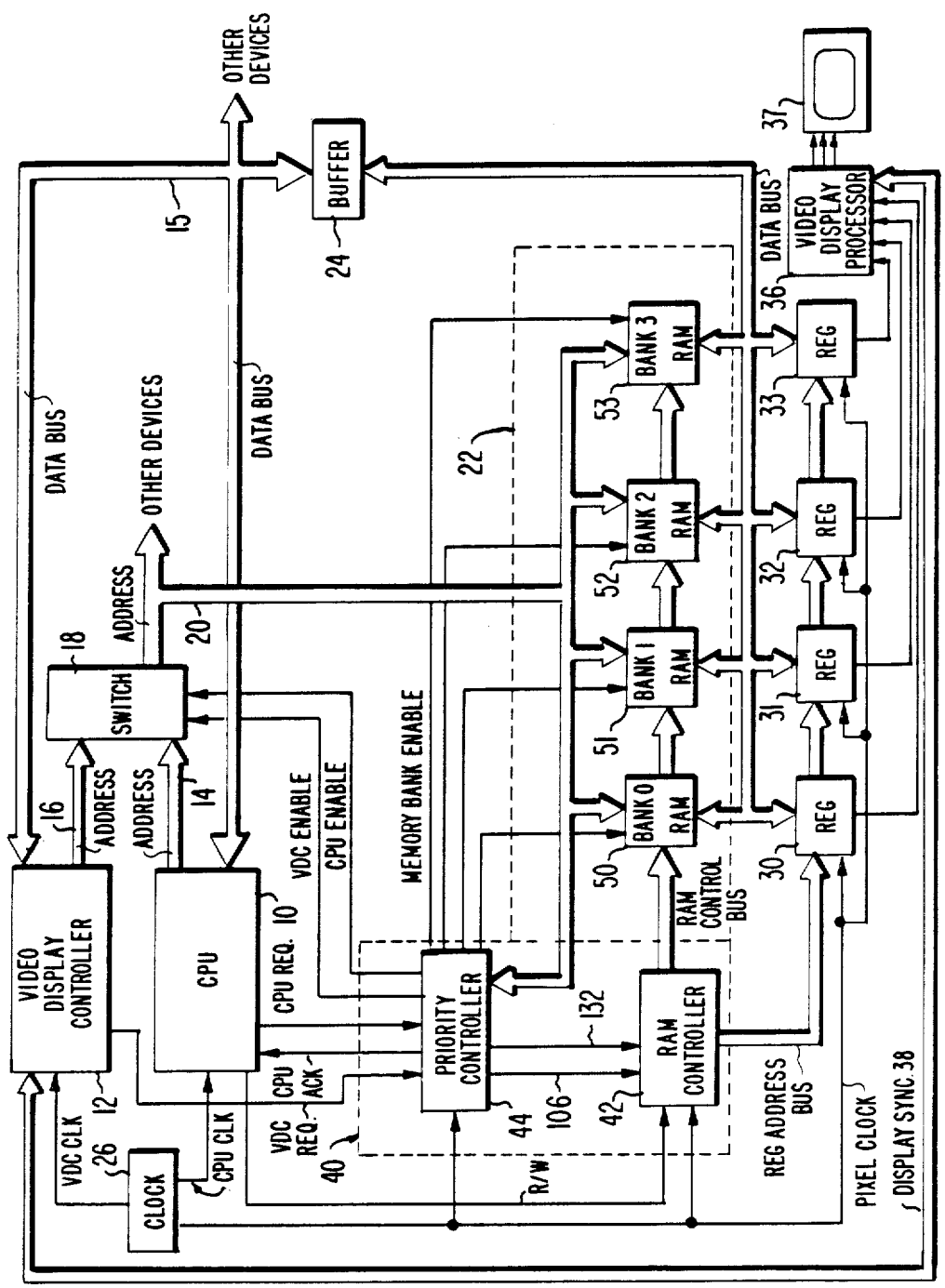
FIG. 1 is a block diagram of a computer system incorporating the present invention.

With initial reference to FIG. 1, a computer system comprises a central processing unit (CPU) 10, which may be a microprocessor, and a video display controller (VDC) 12, both of which are connected to a bi-directional data bus 15 for transmitting and receiving data to and from other components of the computer system. The data bus is able to carry 32 digital bits in parallel and incorporates a data buffer 24. Both the CPU 10 and the VDC 12 have address bus outputs 14 and 16, respectively, which are connected as inputs to a switch 18. The switch 18, when properly enabled, connects one of the two address bus outputs 14 or 16 to a main address bus 20 for the computer system. Both the system address bus 20 and data bus 15 may be connected to other devices such as a keyboard, additional memory, mass storage devices and communication interfaces. The CPU 10 and VDC 12 receive separate clocking signals from a system clock 26.

The computer system also contains a random access memory 22 which is shown in FIG. 1 comprising separate memory banks 50-53 respectively labeled bank 0 through bank 3. The memory 22 is connected to the system address and data buses, 20 and 15, respectively. The memory 22 may comprise static or dynamic memory integrated circuits. Each bank is arranged so that each addressed location within the memory bank contains 32 bits of digital information. Each 32 bit memory location may be read from or written into in parallel. The output from each of the banks of RAM 22 is fed into a separate parallel-in serial-out shift register 30-33 via connection to the system data bus 15.

Figure 5:
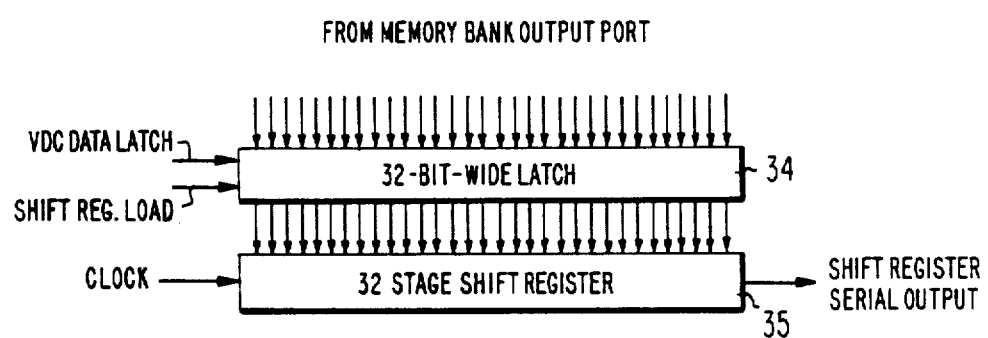
FIG. 5 is a block diagram showing more particularly the type of parallel-in serial-out shift register employed in the invention.

Referring to FIG. 5, the construction of each of the shift registers 30-33 is more specifically shown. Each register comprises a respective 32-bit-wide input data latch 34 in which input data may be temporarily stored responsive to a VDC data latch signal, from which latch 34 the thirty-two consecutive stages of a respective shift register 35 may be parallelly loaded in response to a shift register load signal. The contents of respective shift register 35 may then be read out serially responsive to a serial clocking signal applied thereto.

The combined serial outputs from the shift registers 30-33 form four data bits which represent the video output (e.g. a color) for a given picture element (pixel). The four-bit-wide stream of data from the shift register outputs are fed to a conventional video display processor 36 the output of which is coupled to a display monitor 37. Display processor 36 receives display synchronization signals from VDC 12 via bus 38 and relays them to monitor 37, as shown, or display synchronization signals are supplied to monitor 37 directly from VDC 12.

The memory 22 and the shift registers 30-33 are controlled by a memory controller 40 comprising both of a conventional random access memory controller 42 and a novel priority controller 44, which selects either the VDC 12 or the CPU 10 to be able to access the memory 22. The RAM controller 42 also receives a read-write signal R/W from the CPU 10. Depending on the specific type of memory used, the controller 42 may have additional control lines running between it and the CPU 10, as is readily appreciated by one skilled in the art. The RAM controller 42 produces RAM control signals which are fed to each of the banks of memory 22 on a RAM control bus and also produces shift register control signals on a register address bus connected to the shift registers 30-33.

Figure 2:
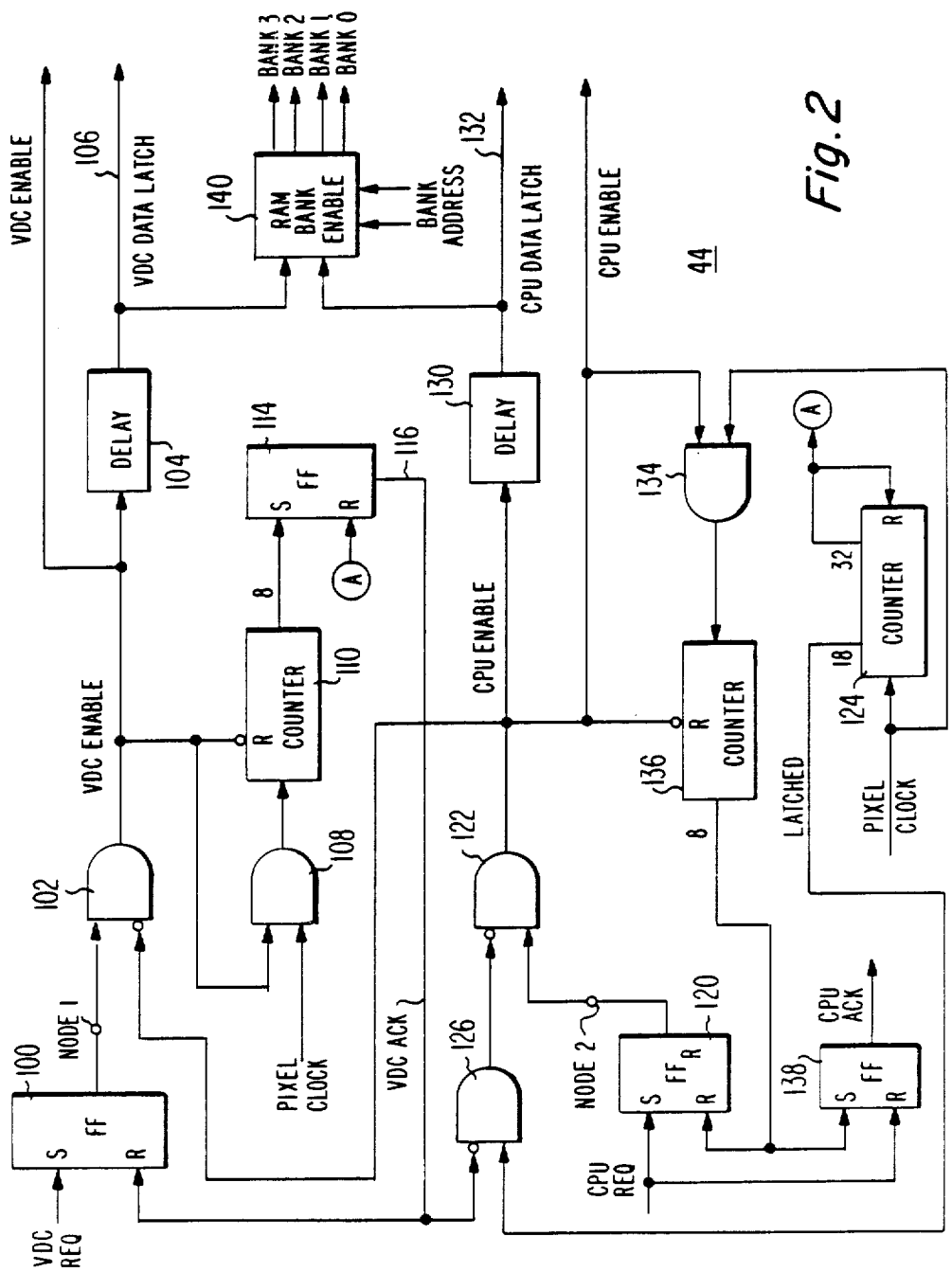
FIG. 2 is a schematic circuit diagram of a portion of the memory control circuit shown in FIG. 1.
Figure 3:
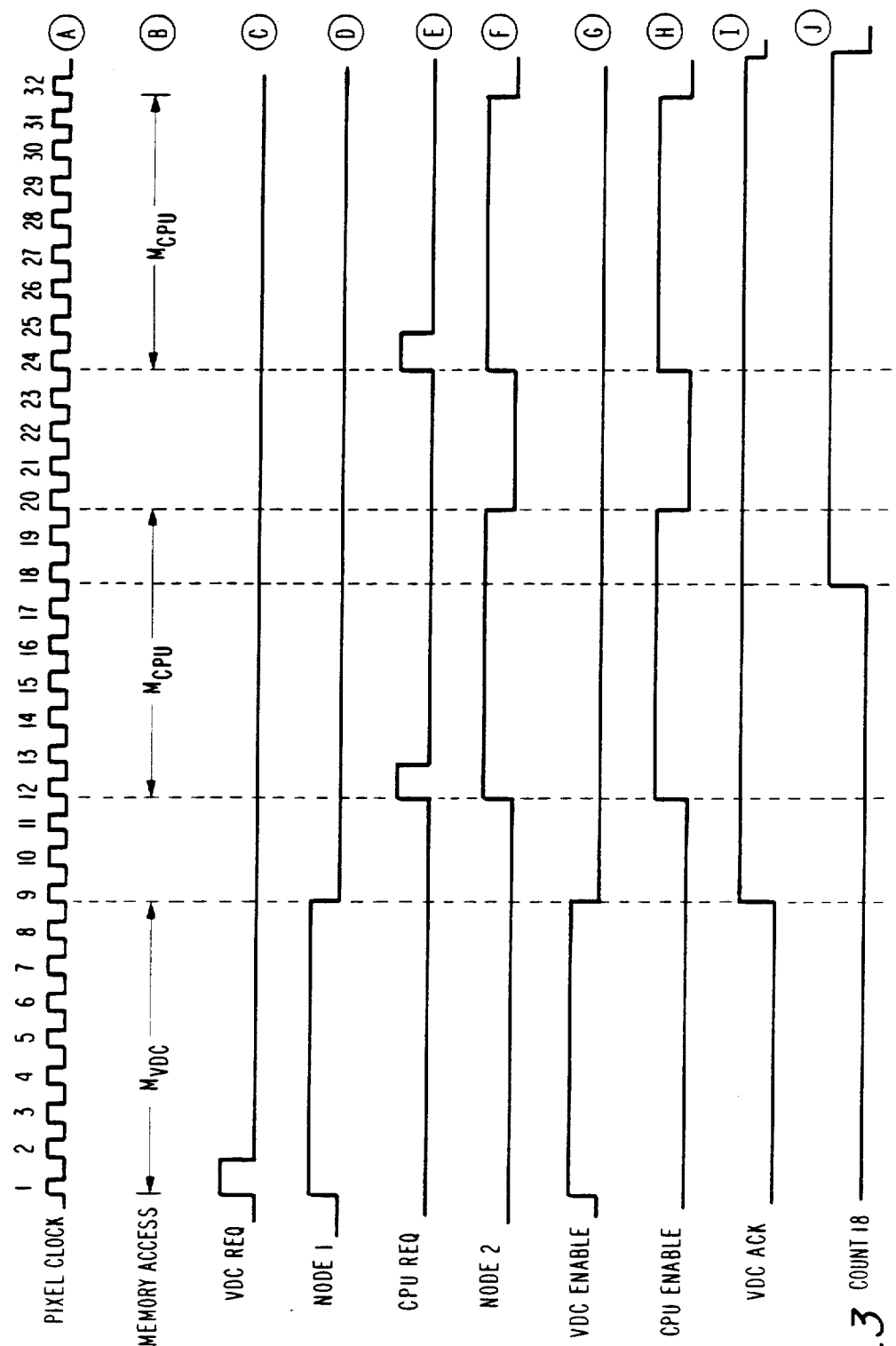
FIGS. 3 and 4 are timing diagrams showing the signal levels at various points in the circuits of FIGS. 1 and 2 under two different memory access conditions.
Figure 4:
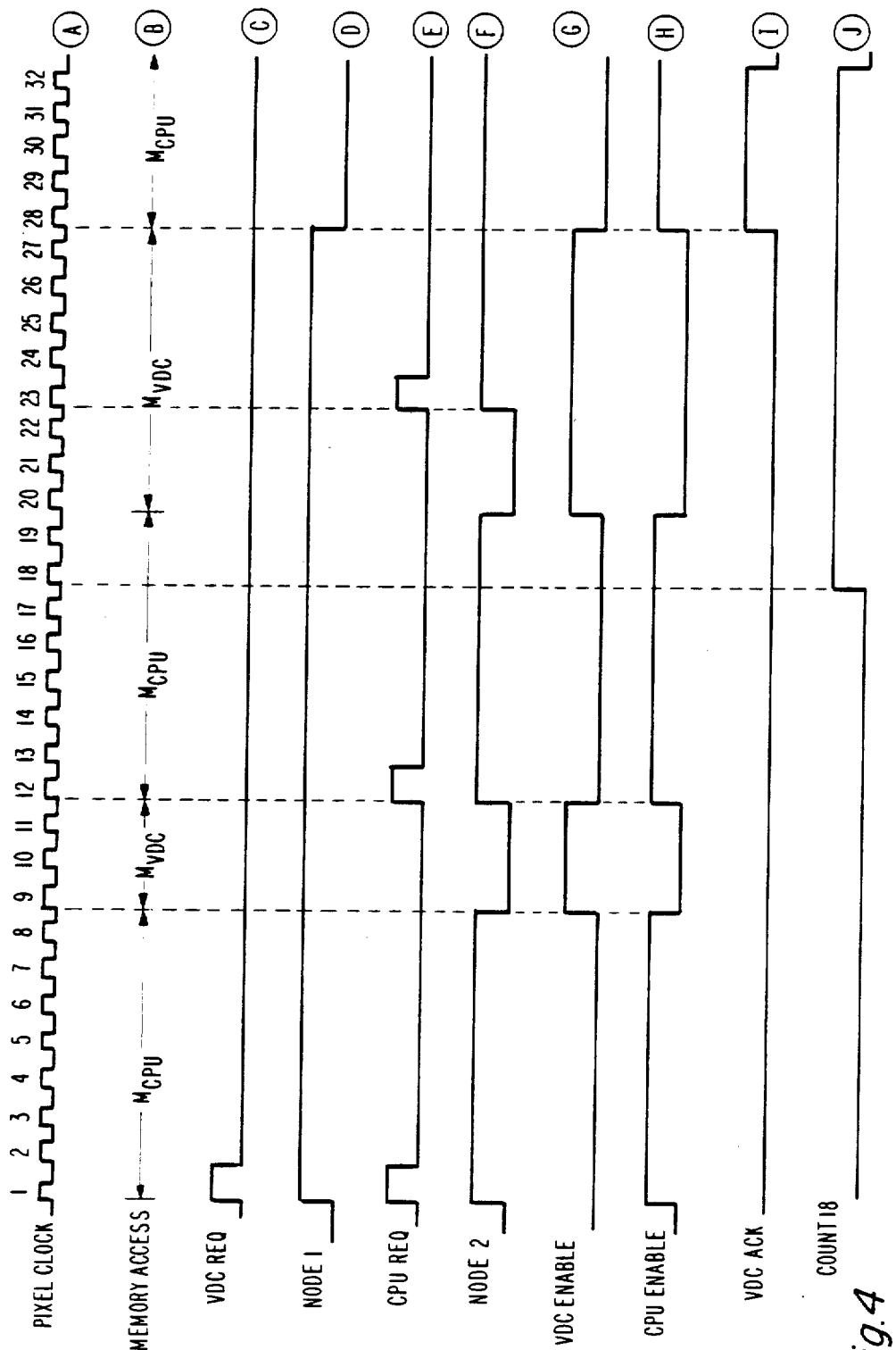

The following description and the particular embodiment and timing diagrams shown in FIGS. 2, 3 and 4, depict an operation of the present invention which involves a specific timing sequence. In particular, a video access period of 32 pixel clock pulses has been chosen as the period during which VDP 36 under control of VDC 12 must be allowed access memory 22 in order to have data in time for display purposes. During this access period data for 32 pixels are read from memory 22. The memory access times for both CPU 10 and VDP 36 are eight clock pulses long. Although a particular timing sequence and corresponding circuit implementation are shown, a variety of sequences and circuits may be used to practice the RAM access protocol of the present invention.

FIG. 2 depicts the detailed circuitry for the priority controller 44 of FIG. 1. The priority controller 44 receives access requests from both the CPU and the VDC on the CPU REQ and the VDC REQ lines respectively. The VDC REQ signal latches a first flip-flop 100 which has its output connected through node 1 to a non-inverting input of a first AND gate 102. The other input of the first AND gate 102 is an inverting input (i.e. has an inverter connected to it) which receives a CPU enable signal, the source of which will be described subsequently.

The output of the first AND gate 102 is a VDC enable signal which is fed as one output of the priority controller 44 to the address bus switch 18 for coupling the VDC address bus 16 to the system address bus 20. The VDC enable signal is also connected as an input to a first delay circuit 104 which delays the VDC enable signal and provides a latched output on output line 106 to the RAM controller 42 (FIG. 1). The VDC data latch output on line 106 indicates that the RAM 22 has now been addressed and that sufficient time has elapsed for the data to be read out of the RAM.

The VDC enable signal is also fed as one input to a second AND gate 108 the other input of which is the clock signal at the pixel frequency from the system clock 26 (FIG. 1). The output of the second AND gate 108 is fed as the input to a counter 110 which provides an output for every eighth input pulse. The counter 110 is reset by the falling edge of the VDC enable pulse. The output of the counter 110 is connected to the set input of a second flip-flop 114 which generates a VDC acknowledge signal (VDC ACK) on line 116. The VDC ACK signal on line 116 is coupled to the reset input of the first flip-flop 100.

The pixel clock signal from clock 26 is fed to the input of a second counter 124 having a latched output indicating that 18 pixel clock pulses have occurred. The counter 124 has an unlatched second output indicating the count of 32 pixel clock pulses. This 32 count output is coupled to the reset inputs of the second flip-flop 114 and the counter 124. The 18 count output of the second counter 124 is coupled to a non-inverting input of a fourth AND gate 126 which has an inverting input to which the VDC ACK signal from the second flip-flop 114 is coupled. The output of the fourth AND gate 126 is coupled to an inverting input of a third AND gate 122. The CPU memory access request (CPU REQ) is connected as the set input of a third flip-flop 120 whose output is connected through node 2 to the non-inverting input of the third AND gate 122.

The output of the third AND gate 122 represents the CPU enable signal which, as noted above, is connected to the inverting input of the first AND gate 102. The CPU enable signal is also coupled to one input of a fifth AND gate 134 having another input to which the pixel clock signal is applied. The output of the fifth AND gate 134 is connected to the input of a third counter 136 and the CPU enable signal is applied to the reset terminal of counter 136. The output of the third counter 136, which indicates a count of eight input pulses, is coupled to the reset input of third flip-flop 120 and the set input of a fourth flip-flop 138. The CPU request signal is connected to the reset input of the fourth flip-flop 138. The output signal of the fourth flip-flop is fed back to the CPU as a CPU acknowledge signal (CPU ACK) to indicate the completion of a CPU memory access.

In addition, the CPU enable signal from the third AND gate 122 is supplied as an output of the priority controller 44 to the switch 18 for connecting the CPU address bus 14 to the system address bus 20. A second delay circuit 130 has the CPU enable signal coupled to its input and provides a latched output (labeled CPU Data Latch) which is fed on line 132 to the RAM controller 42 (FIG. 1) for indicating that the address from the CPU has been fed to the RAM 22 and the data from the RAM is now ready to be read out.

Both the CPU and the VDC data latch signals are fed to a RAM bank enable circuit 140 which also receives at least two bits from the address bus 20. The RAM enable circuit 140 generates an enable signal on at least one of four output lines which are connected to the enable inputs of the four RAM banks 51-53.

The operation of the present invention is best understood with reference to the timing diagrams of FIGS. 3 and 4. Both of these figures show a 32 pixel clock pulse time frame during which period the video display controller must access RAM 22 in order to transfer data from RAM 22 to the various shift registers 30-33 for generating a video output signal. The memory access by the VDC 12 may occur at any period within that 32 pixel period, but must be completed by the start of the next period, in order that the shift registers 30-33 have video data to output to the video signal generator (not shown).

In the first case shown in FIG. 3, the video display controller 12 initiates a memory access ($M_{VDC}$ on timing line B) at the beginning of the first pixel clock pulse. As shown on line C, the VDC controller 12 sends a VDC request at the beginning of the first clock pulse which triggers the first flip-flop 100, FIG. 2. The flip-flop produces a high input to the first AND gate 102 which, because the CPU enable signal is a low at this time, (FIG. 3, line H) causes the first AND gate 102 to produce a high VDC enable signal commencing the VDC access of video data from the RAM 22.

The VDC enable signal is fed to the switch 18 (FIG. 1) which causes the switch to connect the VDC address bus 16 to the system address bus 20 so that the memory address is supplied from the VDC to the RAM 22. After a delay period provided by the first delay circuit 104, the VDC data latch signal is supplied on line 106 to the RAM bank enable circuit 140, which sequentially supplies a RAM enable signal on each of the four output lines connected to separate RAM banks 50-53. The VDC latch signal on line 106 is also supplied to the RAM controller 42 which provides conventional RAM control signals to the memory 22. The RAM controller 42 in response to the VDC data latch signal also sequentially addresses the shift registers 30-33 via the register address bus so that the various registers are enabled in a sequence corresponding to the enabling of the various RAM banks 50-53 by the priority controller 44.

As noted above, each RAM bank 50-53 stores 32 bits of data at each address. Each of the four bits which define a given digital video pixel word is stored in a different one of the banks. Therefore, the 32 bits stored in a given address in each RAM bank represent 32 pixels. That is, the first bit of the 32 bits stored at a given address in each RAM bank represents one of the bits in the first pixel word, the second bit at that address in each bank represents a second pixel word and so on for the 32 bits. By transferring the 32 bits from each RAM bank into a shift register 30-32, 32 pixel words of data are ready to be displayed.

As shown in FIG. 3, the VDC memory access $M_{VDC}$ lasts for eight pixel clock cycles, although, depending on the RAM access time, this period could vary. This period of eight cycles is counted by a first counter 110, which then supplies a set signal to the second flip-flop 114. This set signal causes the output of the second flip-flop 114 to go high, generating the VDC acknowledge (VDC ACK) signal on line 116 that indicates that the VDC has completed an access of the memory within the 32 pixel clock pulse frame. The VDC ACK signal also resets the first flip-flop 100, terminating the VDC enable signal.

At the beginning of clock pulse 12 in FIG. 3, the CPU 10 initiates a memory access ($M_{CPU}$) by generating a CPU REQ signal (line E), which is fed to the priority controller 44. The CPU REQ sets the third flip-flop 120, producing at node 2 a high signal indicating that the CPU desires data (FIG. 3, line F). This request signal is supplied to one input of the second AND gate 122. The other input of the AND gate 122 receives the output from the third AND gate 126. The inputs to the AND gate 126 are the VDC acknowledge signal supplied to the inverting input (which signal is now high) and a low level from the 18 count output of the second counter 124. Therefore, the third AND gate 126 will at this time produce a low level output signal. This signal applied to the inverting input of the second AND gate 122 will produce a high CPU enable signal (FIG. 3, line H).

In a similar manner to the VDC enable signal, previously described, the high CPU enable signal causes the switch 18 to connect the CPU address bus 14 to the system address bus 20 and generates a CPU data latch signal on line 132, after an appropriate delay in circuit 130. This delayed CPU data latch signal enables the CPU writing or reading of the data to or from the RAM 22. Unlike the VDC access, when the CPU "reads" the RAM 22, the data is not sent to the shift registers 30-33. As noted, the CPU memory access time period $M_{CPU}$ is eight clock pulses wide at the end of which the third counter 136 has counted eight pixel clock pulses and emits a reset signal to the third flip-flop 120 which terminates the CPU enable signal. The output of the third counter 136 also sets the fourth flip-flop 138 to send a memory access acknowledge signal to the CPU 10.

A similar CPU memory access occurs at clock pulse 24. The operation of the computer system and the priority controller 44 in particular is identical to the previous CPU access.

Another timing sequence of memory accesses is shown in FIG. 4. In this instance, VDC 12 initiates a request at the beginning of access period, as evidenced by the VDC REQ signal going high for the first pixel clock cycle. However, CPU 10 at that instant also is requesting access to the memory, as indicated by the CPU REQ signal going high for that same clock cycle. With reference to the priority controller 44 circuit shown in FIG. 2, the CPU request signal applied to the third flip-flop 120 initiates a CPU enable signal at the output of the third AND gate 122, as was described in detail above with respect to the FIG. 3 accessing. This CPU enable signal going high and being applied to the first AND gate 102 inhibits the VDC request from generating a high VDC enable signal, as shown on line G of FIG. 4. This inhibits the VDC 12 access to RAM 22 and enables only the CPU 10 to gain access. Thus, CPU 10 has memory access priority.

After the eight cycle CPU memory access is completed (at the end of pixel clock cycle 8), the output from the third counter 136 resets the third flip-flop 120, terminating the CPU enable signal. At the beginning of the ninth CPU clock cycle, the high level still at node 1 indicates that the VDC 12 is requesting access to the memory 22 (or there is a previously requested access which is yet to be fulfilled). Since the CPU enable signal is at a low level (FIG. 4, line H), the first AND gate 102 initiates a VDC enable signal, commencing a VDC memory access, $M_{VDC}$. The VDC continues to access the memory until the beginning of clock cycle 12, at which time the CPU sends a memory request to the priority control 44. This CPU memory request generates a high CPU enable signal, which when applied to the input of the first AND gate 102 terminates the VDC enable signal and the VDC memory access. The high CPU enable signal then begins a new CPU memory access at pixel clock pulse 12, which lasts for eight clock pulses until the beginning of clock pulse 20.

It is apparent from FIG. 4 that, from clock pulse 18 forward in time, there is insufficient time remaining in the 32 clock pulse period for both CPU 10 and VDP 36 under control of VDC 12 to access the memory (i.e. only 15 clock cycles remain and 16 are needed). As a result, at clock pulse 18, the second counter 124 emits a high level signal to the third AND gate 126 (FIG. 4, line J). Therefore, at clock pulse 20, when the current CPU memory access is terminated, the VDC once again initiates a memory access because the signal at node 1 is still high. However, at clock pulse 23, when another CPU request pulse is sent, the request signal as applied through node 2 to the second AND gate 122 does not generate a CPU enable at the output of the third AND gate 122. The latched high count 18 signal from counter 124 and low VDC ACK signal applied to the fourth AND gate 126 generate a high output, which when fed to the inverting input of the second AND gate 122 inhibits the generation of a CPU enable signal. This permits the VDC memory access to continue for its normal duration of eight clock cycles, terminating at the completion of the twenty-seventh clock cycle. Therefore, after pixel clock cycle 18 the VDC exercises priority over memory access.

Once this VDC access has been completed at clock cycle 28, the acknowledge signal VDC ACK goes high, which when applied to the third AND gate 126, generates a low output. The low output from the third AND gate 126 applied to the inverting input of the second AND gate 122 along with the high request signal from node 2 being applied to the other input generates a CPU enable signal, which commences another CPU access. At the end of clock pulse 32, the second counter 124 generates a reset signal for the second flip-flop 114, terminating the VDC acknowledge signal. However, since the last CPU access is not completed, it continues into the next 32 pixel clock pulse time frame.

It is apparent from the various examples of CPU and VDC accessing portrayed in FIG. 4 that up until the eighteenth clock pulse, CPU 10 has priority over VDP 36 as controlled by VDC 12 in accessing RAM 22. However, from the eighteenth clock pulse onward in time there is insufficient time remaining in the memory access period for both a video display controller and a CPU access to occur. Therefore, from the eighteenth clock pulse onward, VDC 12 has priority over any new accesses to RAM 22 while allowing any existing CPU access to continue until its natural termination. If VDC 12 has already completed its periodic memory access prior to the eighteenth pulse, even though VDC 12 has priority, it is never exercised, as VDC 12 carries out only one access per period. This priority scheme provides for less restricted access to RAM 22 by CPU 10, avoiding delaying the CPU access as often for a VDC access, thus permitting improved efficiency of the CPU processing. Furthermore, this priority scheme provides for CPU 10 not having to be synchronized with the video display processor. This allows CPU 10 to run at a much higher clock frequency, to improve the speed of the CPU processing.

Figure 6:
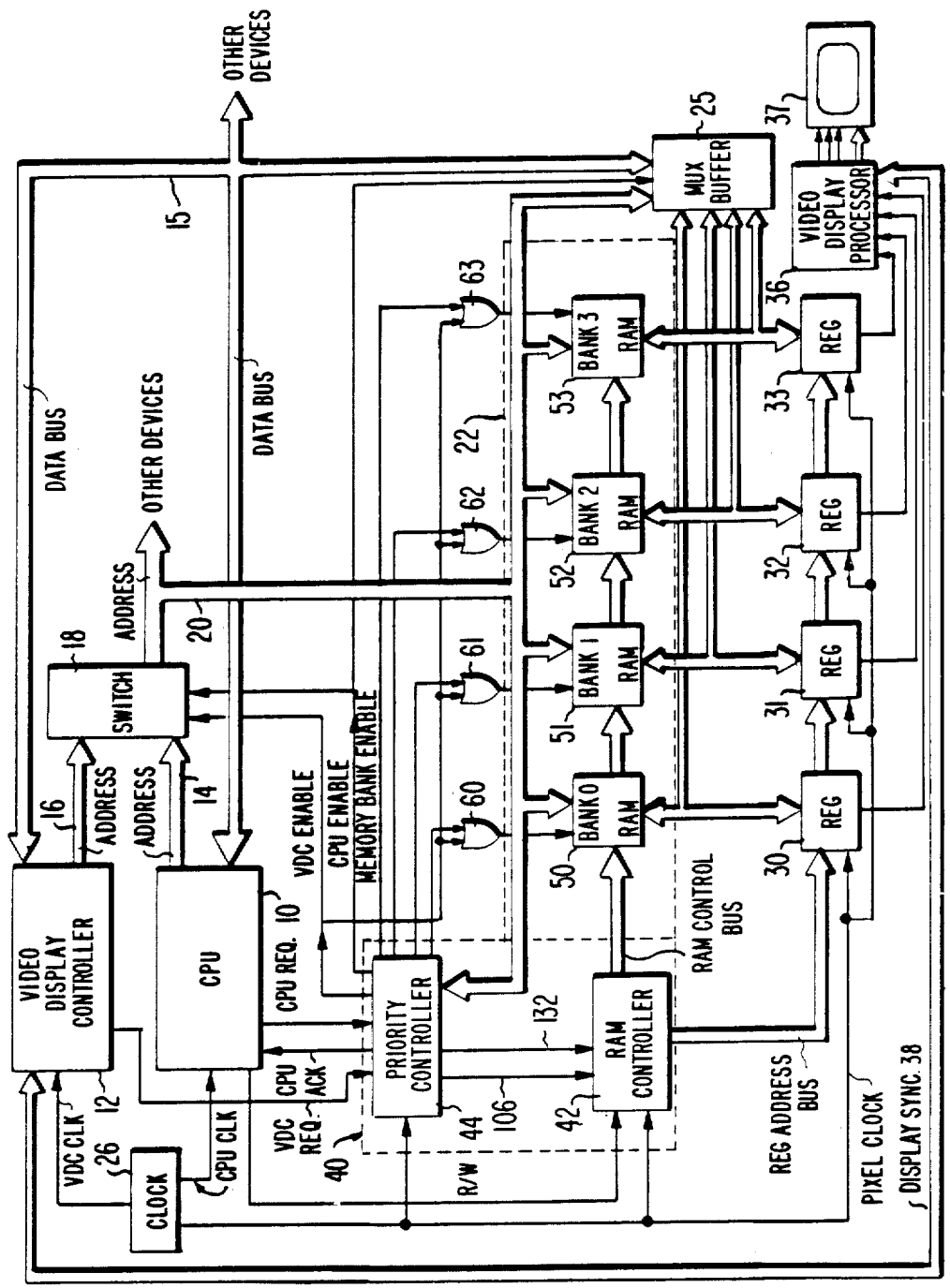
FIG. 6 is a block diagram of another computer system incorporating the present invention.

FIG. 6 shows a somewhat different computer system than that shown in FIG. 1, which allows CPU 10 even more freedom of access to RAM 22 than the FIG. 1 computer system. This is achieved by providing for the banks 50-53 of RAM 22 not being accessed to or from a common data bus, except as mediated by a multiplexer/buffer 25, which replaces buffer 24 of FIG. 1. Multiplexer/buffer 25 responds to the RAM enable signal, and to those bits of the address on the main address bus 20 which indicate which of banks 50-53 is selected to be written to or read from during a CPU access, to selectively connect the access port of the selected bank to data bus 15, conditioned upon CPU enable signal being provided from priority controller 44. This modification allows registers 30-33 to be loaded from banks 50-53 simultaneously, rather than sequentially, during a VDC access. The VDC enable signal is used to select all banks 50-53 of RAM 22 for parallel read-out to their respective parallel-in/serial-out shift registers 30-33. This is done by ORing the VDC enable signal with the memory bank enable signals from priority control 44. This is done in OR gates 60-63, respectively, the output signals from OR gates 60-63 controlling the enabling of banks 50-53 of RAM 22 for read out during VDC access. So total VDC access time is reduced.

Figure 7:
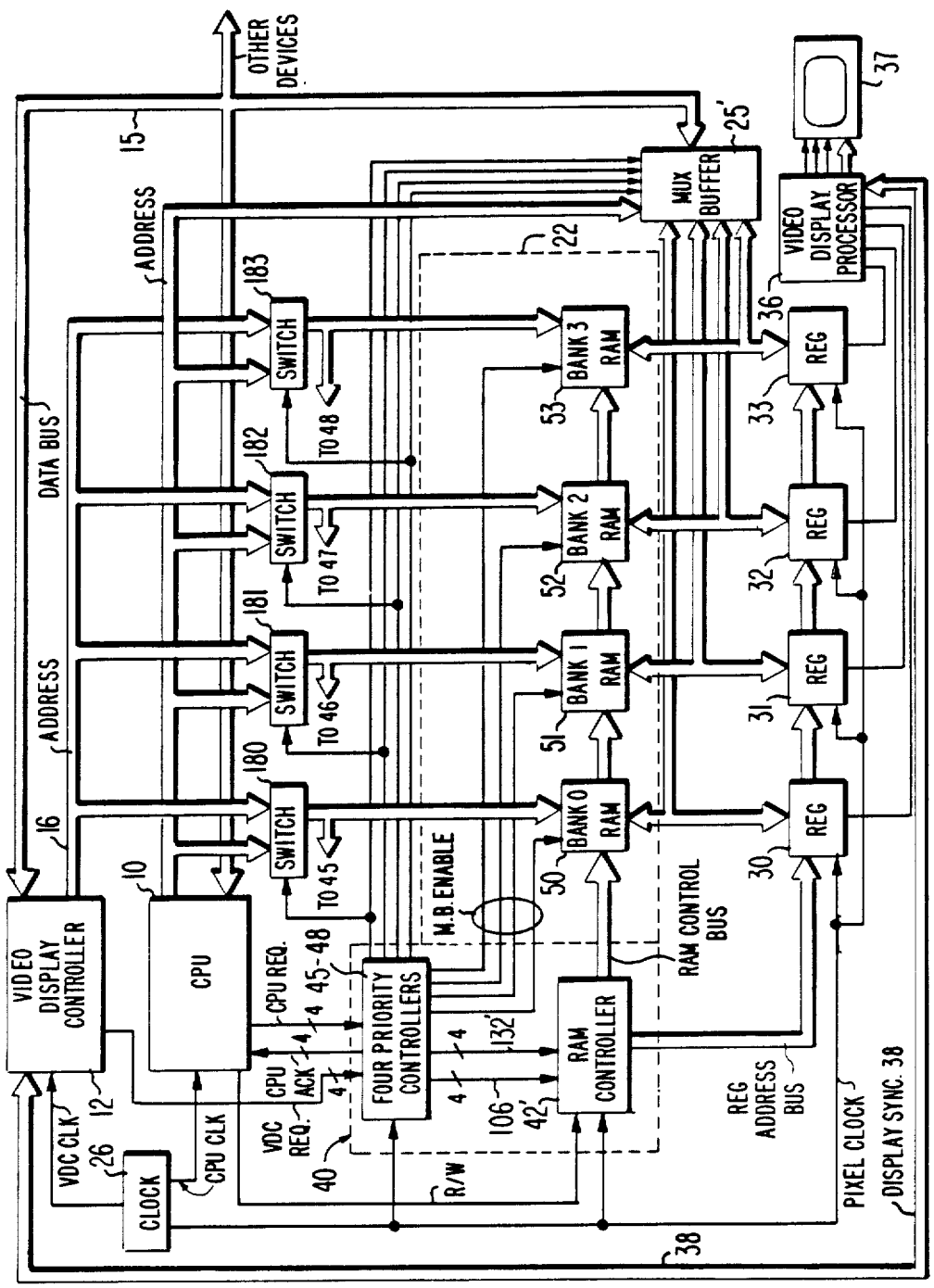
FIG. 7 is a block diagram of still another computer system incorporating the present invention.

FIG. 7 shows a computer system that allows even greater freedom of access by CPU 10. Banks 50-53 of RAM 22 have separate respective priority controllers 45-48 (shown in one box), each resembling priority controller 44. Banks 50-53 receive their addresses from CPU 10 or from VDC 12 as separately determined by respective address switches 180-183, respectively controlled by priority controllers 45-48, rather than as determined by priority address switch 18. VDC enable and CPU enable signals are shown being supplied on a single line from each of priority controllers 45-48. Responsive to the signals on these four single lines, a modified multiplexer/buffer 25' selects CPU 10 to no more one of the banks 50-53 of RAM 22.

Since CPU can only access one of the banks 50-53 at a time, the other banks are more likely to be able to load registers 30-37 earlier in each memory cycle. If the CPU tends to access each of the banks 50-53 within each memory cycle, it is rare that a memory cycle will near completion without registers 30-33 all having been loaded, so that CPU access would have to be postponed.

In the computer systems described in connection with FIGS. 1, 6 and 7, RAM 22 is shown as having four banks 50-53 for supplying four-bit video codes to registers 30-33 for transmittal to video display processor 36. Video display processor 36 is then presumably of a type using a color look-up table responsive to the four-bit video codes to place one of sixteen colors at each pixel location on the display screen of display monitor 37. This type of video display processor 36 may be used with video codes having a greater number of bits, with the number of banks in RAM 22 and the number of associated parallel-in/serial-out registers being increased correspondingly.

Increasing the number of banks in RAM 22 and the number of associated parallel-in/serial-out registers to similar higher number will also allow a video display processor 36 of a different type to be used. For example, twelve banks of memory may be used in RAM 22, with four bits from four associated parallel-in/serial-out registers being used to describe the red component portions of display picture elements, with five bits from four associated parallel-in/serial-out registers being used to describe the green component portions of display picture elements, and with three bits from three associated parallel-in/serial-out registers being used to describe the blue component portions of display picture elements. These digital red, green and blue signals would be converted to red, green and blue analog drive signals for display monitor 37 by digital-to-analog converters in video processor 36, without need for color look-up tables. A number of other schemes for storing video codes in RAM 22 and retrieving them in accordance with the invention will readily occur to one skilled in the art and armed with the foregoing disclosure, and this should be borne in mind when deciding matters of infringement of the following claims.

I claim:

1. A system comprising a plurality, n in number, of banks of digital memory, each bank having a respective m-bit-wide output port, m and n each being a respective positive integer greater than one;
    a plurality, n in number, of shift registers, each respectively having m successive stages with respective input ports and each having a respective output port in its final stage, which said plurality of shift registers are synchronously clocked for transferring the contents of their stages serially through their output ports as n-bit-wide data streams;
    a plurality, n in number, of latches, each corresponding to a different respective bank of the digital memory and to a different respective register and having one input port to which the output port of a corresponding bank of said digital memory connects, and each having an m-bit-wide output port corresponding to and connected to the m input port of a different respective one of said plurality of shift registers;
    first means for normally cyclically accessing each bank at prescribed times in each cycle for delivering first data to the input port of each of said plurality of latches from the output port of its corresponding respective bank of said digital memory;
    means for periodically loading the m successive stages of each of said shift registers from the m-bit-wide output port of its respective corresponding latch;
    second means for otherwise accessing each bank of said digital memory at other times asynchronously relative to said prescribed times for delivering second data to the respective latch corresponding to that bank, said prescribed and other times tending to occassionally occur concurrently;
    priority means responsive to the concurrence of said prescribed times and said other times for assigning priority to said second means in a terminal portion of each cycle; and
    means for utilizing the n-bit-wide data stream clocked serially from the output ports of said plurality of shift registers, said means for utilizing comprising a display monitor responsive to raster scan video signals and a video data processor for generating, responsive to the n-bit-wide data stream, said video signals and for applying said video signals to said display monitor.

2. The system as set forth in claim 1 wherein said second means for otherwise accessing each bank of said digital memory includes a processor unit that generates a processor unit request signal when access to said digital memory is desired by said processor unit.

3. The system as set forth in claim 1 wherein said digital memory is of random access type.

4. The system as set forth in claim 2 wherein the output port of each bank of said digital memory includes means for selectively causing that output port to serve as an input port for that bank of digital memory.

5. The system as set forth in claim 4 having:
    an m-bit-wide data buffer having a first input port to which said processor unit connects and having a second output port, between which first and second ports connection is provided at other than said prescribed times; and
    an m-bit-wide data bus connected to the output port of said data buffer, the m-bit-wide ports of all the banks of said digital memory, and all the input ports of said plurality of latches.

6. The system as set forth in claim 5 wherein said first means for accessing said banks at said prescribed times includes means responsive to a control signal manifesting said prescribed times, said priority means including:
    means for determining consecutive cycles each of a given duration proportional to the stage-to-stage transfer, or clocking, rate of said plurality of shift registers;
    means for reserving within each of said consecutive cycles a respective one of said prescribed times; and
    means responsive to said means for determining and means for reserving for generating said control signal.

7. The system as set forth in claim 6 wherein said means for reserving within each of said consecutive cycles a respective one of said prescribed times comprises:

means for providing indication of whether or not each of said consecutive cycles is sufficiently spent that the remaining duration of that cycle is less than a given fraction of a cycle which fraction of a cycle is of at least sufficient duration in which to deliver said first and second data from the output ports of the banks of said digital memory to the input ports of said latches; and means for recording the incidence of one of said prescribed times within that cycle;

said means for generating said control signal including means for generating said control signal at said prescribed times (A) when there is a concurrent absence of (1) a processor unit request signal, (2) an indication that the remainder of the current cycle is less than said given fraction of a cycle, and (3) a recorded incidence of one of said prescribed times already having occurred within that cycle; and (B) upon the indication that the remainder of that cycle is less than said given fraction of a cycle, absent a recorded incidence of one of said prescribed times already having occurred within that cycle.

8. The system as set forth in claim 4 including a plurality, n in number, of m-bit-wide data busses to each of which connects the m-bit-wide output port of a respective one of the banks of said digital memory and the m-bit-wide input port of the respective latch corresponding to the bank of said digital memory; and a buffer multiplexer for connecting said processor unit to the m-bit-wide output port of a selected bank of said digital memory at said times other than the prescribed times for delivering said second data to the input port of its respective corresponding latch.

9. The system as set forth in claim 8 wherein said first means for accessing said banks at said prescribed times includes means responsive to a control signal manifesting said prescribed times, said priority means including:

means for determining consecutive cycles each of a given duration proportional to the stage-to-stage transfer, or clocking, rate of said plurality of shift registers;

means for reserving within each of said consecutive cycles a respective one of said prescribed times; and means responsive to said means for determining and means for reserving for generating said control signal.

10. The system as set forth in claim 9 wherein said means for reserving within each of said consecutive cycles a respective one of said prescribed times comprises:

means for providing indication of whether or not each of said consecutive cycles is sufficiently spent that the remaining duration of the cycle is less than a given fraction of a cycle which fraction of a cycle is of at least sufficient duration in which to deliver said first and second data from the output ports of the banks of said digital memory to the input ports of said latches; and means for recording the incidence of one of said prescribed times within that cycle;

said means for generating said control signal including means for generating said control signal at said prescribed times (A) when there is a concurrent absence of (1) a processor unit request signal, (2) an indication that the remainder of the current cycle is less than said given fraction of a cycle, and (3) a recorded incidence of one of said prescribed time already having occurred within that cycle; and (B) upon the indication that the remainder of that cycle is less than said given fraction of a cycle, absent a recorded incidence of one of said prescribed times already having occurred within that cycle.

11. The system as set forth in claim 4 wherein said priority means includes means for generating a control signal manifesting said prescribed and other times, said system including means for storing video data in said digital memory and means for addressing the banks of said digital memory in parallel comprising:

means for generating memory addresses as required by said processor unit, when access to said digital memory is being requested by said processor unit;

a video display controller for generating display synchronization signals for said display monitor and sequentially generating memory addresses at which said video data are stored in said digital memory; and an address switch responsive to said control signal for selecting memory addresses generated by said video display controller for application to the banks of said digital memory during said prescribed times, and for otherwise selecting memory addresses as required by said processor unit for application to the banks of said digital memory at said other times.

12. The system as set forth in claim 8 including:

means for generating first memory addresses as required by said processor unit when access to said digital memory is being requested by said processor unit;

a video display controller (VDC) for generating a video display request signal, for generating display synchronization signals for said display monitor and for sequentially generating second memory addresses at which video data are stored in said digital memory;

said priority means including a respective priority controller for each bank of said digital memory, each controller responsive to said processor unit request signal and video display request signal for generating a switch control signal; and a respective address switch for each bank of said digital memory, each switch being responsive to said processor unit and video display request signals and controlled by its respective priority controller, said switches selecting one of said first and second memory addresses for respective application to that bank of said digital memory during said other times for selecting memory addresses as required by said processor unit for application to that bank of said digital memory and during said prescribed times for selecting memory addresses generated by said video display controller as required by said video display controller.

13. The system as set forth in claim 12 wherein said priority controllers each comprises:

means for determining consecutive cycles each of a given a duration proportional to the stage-to-stage transfer, or clocking, rate of said plurality of shift registers;

means for providing indication of whether or not each of said consecutive cycles is sufficiently spent that the remaining duration of that cycle is less than a given fraction of a cycle, which fraction of a cycle is of at least sufficient duration in which to deliver said first and second data from the output port of a bank of said digital memory to the input port of its corresponding respective latch;

first respective means coupled to and corresponding to each priority controller for recording the incidence within that cycle of one of the prescribed times of the bank of said digital memory corresponding to that priority controller;

second respective means included within each priority controller for initiating a prescribed time for its corresponding bank of said digital memory when there is a concurrent absence of (1) a processor unit request signal for the bit plane stored in its associated bank of said digital memory, (2) an indication that the remainder of that cycle is less than said given fraction of a cycle, and a (3) recorded incidence of one of said prescribed times for its corresponding bank of said digital memory already having occurred within that cycle; and third respective means included within each priority controller for initiating a prescribed time for its corresponding bank of said digital memory, upon the indication that the remainder of that cycle is less than said given fraction of a cycle, absent a recorded incidence of one of said prescribed times for its corresponding bank of said digital memory already having occurred within that cycle.

14. The system of claim 1 wherein said utilization means comprises a display monitor responsive to raster scan video display signals and a video processor for generating in response to the n-bit wide data stream, said video signals and for applying said video signals to said display monitor;

said second means for otherwise accessing each bank includes a processor unit that generates a processor unit request signal when access to said banks is desired by the processor unit;

said priority means includes means for generating a control signal manifesting said prescribed and other times, said system including means for storing video data in said digital memory and means for addressing the banks of said digital memory in parallel comprising:

means for generating memory addresses as required by said processor unit, when access to said digital memory is being requested by said processor unit;

a video display controller for generating display synchronization signals for said display monitor and sequentially generating memory addresses at which said video data are stored in said digital memory; and an address switch responsive to said control signal for selecting memory addresses generated by said video display controller for application to the banks of said digital memory during said prescribed times, and for otherwise selecting memory addresses as required by said processor unit for application to the banks of said digital memory at said other times.

15. The system of claim 1 wherein said second means includes a processor unit for generating a processor unit request signal when access to the banks is desired by the processor unit, said first means including a video display controller for generating a video display request signal when access to the banks is desired by the video display controller, said priorty means including means responsive to said processor unit request signal for assigning priority to said processor unit in said initial portion of each cycle and means responsive to said video display request signal for assigning priority to said video display controller in said terminal portion of each cycle.

* * * * *